(No Model.)
C. H. BENJAMIN.
ROTARY CUTTER.
No. 388,523. Patented Aug. 28, 1888.
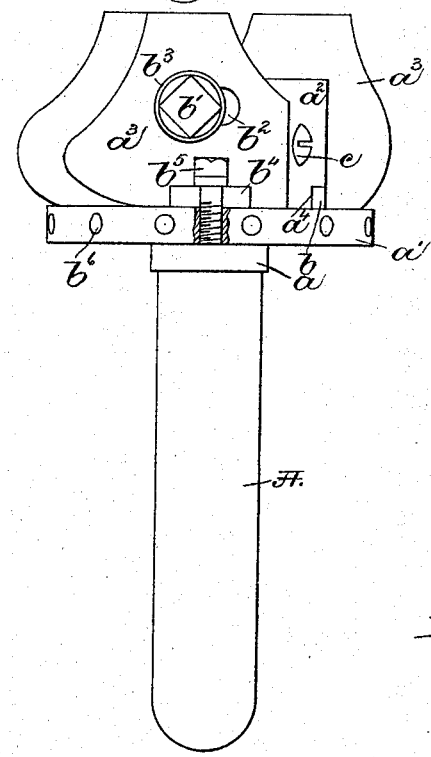
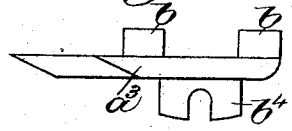
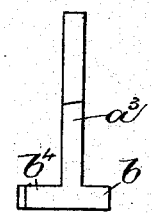
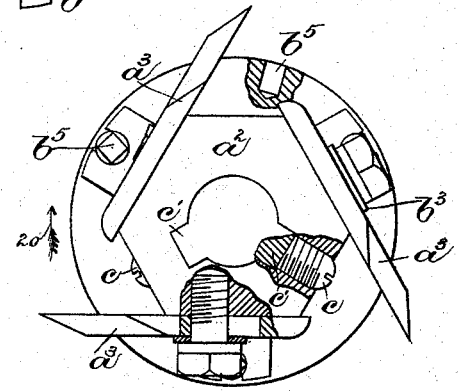
Witnesses.
Howard G. Eaton.
Fred L. Emery.
Inventor.
Charles H. Benjamin,
by Crosby & Gregory, attys.

UNITED STATES PATENT OFFICE.

CHARLES H. BENJAMIN, OF BOSTON, ASSIGNOR TO JAMES W. BROOKS, TRUSTEE, OF CAMBRIDGE, MASSACHUSETTS.

ROTARY CUTTER.

SPECIFICATION forming part of Letters Patent No. 388,523, dated August 28, 1888.

Application filed October 31, 1887. Serial No. 253,845. (No model.)

*To all whom it may concern:*

Be it known that I, CHARLES H. BENJAMIN, of Boston, county of Suffolk, and State of Massachusetts, have invented an Improvement in Rotary Cutters, of which the following description, in connection with the accompanying drawings, is a specification, like letters on the drawings representing like parts.

This invention relates to rotary cutters especially adapted, among other things, to be used on machines for trimming heels of boots or shoes, it having for its object to improve the construction of the same, whereby the knives may be adjusted automatically and simultaneously to place them in position to be sharpened, so that a minimum amount of sharpening is required to place the cutting-edges of the said knives in correct relation to each other—that is, in the circumference of a circle having as its center the center of the shaft or arbor upon which in practice the rotary cutter is mounted.

My invention therefore consists, essentially, of a rotary cutter comprising a disk or plate, a cutter-head, and a knife secured both to the said disk or plate and cutter-head, substantially as will be described.

Other features of my invention will be pointed out in the claims at the end of this specification.

Figure 1 shows in elevation a rotary cutter embodying my invention; Fig. 2, a top or plan view, partially broken out; Fig. 3, a detail of one of the knives, and Fig. 4 a detail to be referred to.

The shaft A, which may be a shaft of a machine for trimming heels of boots or shoes, is provided, as shown, with a collar, $a$, against which bears a disk or plate, $a'$, loosely mounted upon the said shaft. The shaft A has loosely mounted upon it a block, $a^2$, constituting a cutter-head, to which the knives $a^3$ are secured, as will be described. The cutter-head $a^2$ is herein shown as hexagonal in shape, and three of its sides are rabbeted near one face, as at $a^4$, to form, with the upper face of the disk or plate $a'$, grooves in which enter lugs $b$ at the inner faces of the knives $a^3$ when the said knives are placed against the cutter-head, to be secured thereto by bolts, as $b'$, inserted loosely through slots $b^2$ in the said knives, washers $b^3$ being interposed between the said bolts and knives. Each knife $a^3$ is provided on its outer face, as herein shown, with a forked arm, $b^4$, adapted to engage a bolt, $b^5$, screwed into a hole in the disk or plate $a'$, and by which bolt the knife is securely fastened to the said disk or plate. The disk or plate $a'$ is provided, as shown, with holes $b^6$ in its periphery, into which a rod (not shown) may be placed to rotate the said disk to adjust the position of the knives, as will be described.

The cutter-head may be made fast upon the shaft by the screws $c$, the inner ends of which, as herein shown, bear against longitudinal ribs $c'$ on the shaft A.

In operation the knives are fastened to the cutter-head by the bolts $b'$, and the disk or plate $a'$ is connected to the knives by the bolts $b^5$, and the cutter-head is made fast on the shaft by the screws $c$. When it is desired to sharpen the knives by grinding or otherwise, the bolts $b^5$ and $b'$ are loosened and the disk or plate $a'$ is turned, while the shaft A and cutter-head remain stationary, or vice versa, the said disk or plate, when turned in the direction of arrow 20, Fig. 2, acting through the screws $b^5$ to move the knives so that their cutting-edges are all moved outward simultaneously and automatically, the extent of such movement being under the control of the operator, so as to place the edge of each knife in the position it should occupy to enable it to be ground with the minimum waste.

The cutter-head is herein shown as prevented from rotating independently of the shaft A by the ribs $c'$; but, if desired, the said ribs may be made as independent pieces fitted into grooves in the cutter-head, the screws $c$ in this instance being tightened up, so as to press the said pieces against the shaft A, and thus secure the cutter-head to the said shaft.

I do not broadly claim a cutter in which the blades or knives are simultaneously adjusted automatically.

I claim—

1. The rotary cutter constructed substantially as herein described, it comprising a disk or plate, a cutter-head, and a knife secured to both the said disk or plate and cutter-head and capable of adjustment by movement of either the said disk or cutter-head, the one with relation to the other, substantially as described.

2. In a rotary cutter constructed substantially as herein described, the combination, with a shaft, of a disk or plate loosely mounted thereon, a cutter-head, and a knife secured to both the said cutter-head and disk or plate and capable of adjustment by movement of the said disk or cutter-head, the one with relation to the other, substantially as described.

3. A rotary cutter comprising a disk or plate, $a'$, a cutter-head provided with a rabbet to form a groove with the said plate or disk, and a knife secured to the said disk or plate and having lugs to enter the said groove, substantially as described.

In testimony whereof I have signed my name to this specification in the presence of two subscribing witnesses.

CHARLES H. BENJAMIN.

Witnesses:
JAS. H. CHURCHILL,
C. M. CONE.